3,055,887
PROCESS FOR PRODUCING 6-HALO-17-HYDROXY-PREGNANES AND INTERMEDIATES THEREIN
Albert Wettstein, Riehen, and Georg Anner and Jindrich Kebrle, Basel, Switzerland, assignors to Ciba Corporation, a corporation of Delaware
No Drawing. Filed Feb. 9, 1960, Ser. No. 7,547
Claims priority, application Switzerland Feb. 12, 1959
9 Claims. (Cl. 260—239.55)

The present invention is based on the observation that esters of new halogeno-pregnane compounds of the formula

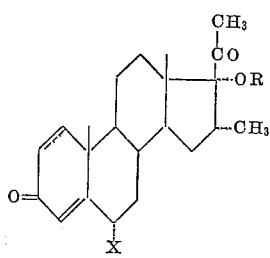

in which R represents an aliphatic acyl radical, and X represents a fluorine or chlorine atom, and which compounds may contain an additional double bond in the 1:2-position—are obtained when a $\Delta^{5\cdot 17(20)}$-3$\beta$:20-diacyloxy-16$\alpha$-methylpregnadiene of the formula

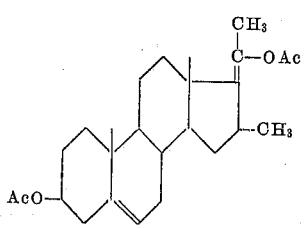

is oxidized with a peracid; the acyloxy groups are then hydrolyzed; in the resulting 3:17$\alpha$-dihydroxy-5$\alpha$:6$\alpha$-oxido-16$\alpha$-methyl-pregnane-20-one, before or after the oxidation of the 3-hydroxyl group to the keto group, the 5$\alpha$:6$\alpha$-oxido group is opened up to form the 5$\alpha$-hydroxy-6$\beta$-fluorohydrin or 5$\alpha$-hydroxy-6$\beta$-chlorohydrin; the 5$\alpha$-hydroxyl group is eliminated while forming the 4:5-double bond; a 6$\beta$-halogeno compound is isomerized to a 6$\alpha$-halogeno compound; at any desired stage of the process following the oxidation in the 3-position the 17$\alpha$-hydroxyl group is esterified; and, if desired, a double bond is introduced into the 1:2-position of the resulting $\Delta^4$-3:20-dioxo-17$\alpha$-acyloxy-16$\alpha$-methyl-6$\alpha$-fluoro- or -6$\alpha$-chloro-pregnene.

The process is represented by the following formulae in which Ac represents an acyl group and X stands for a fluorine or chlorine atom:

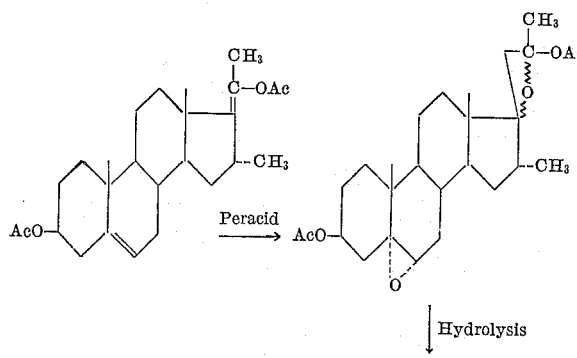

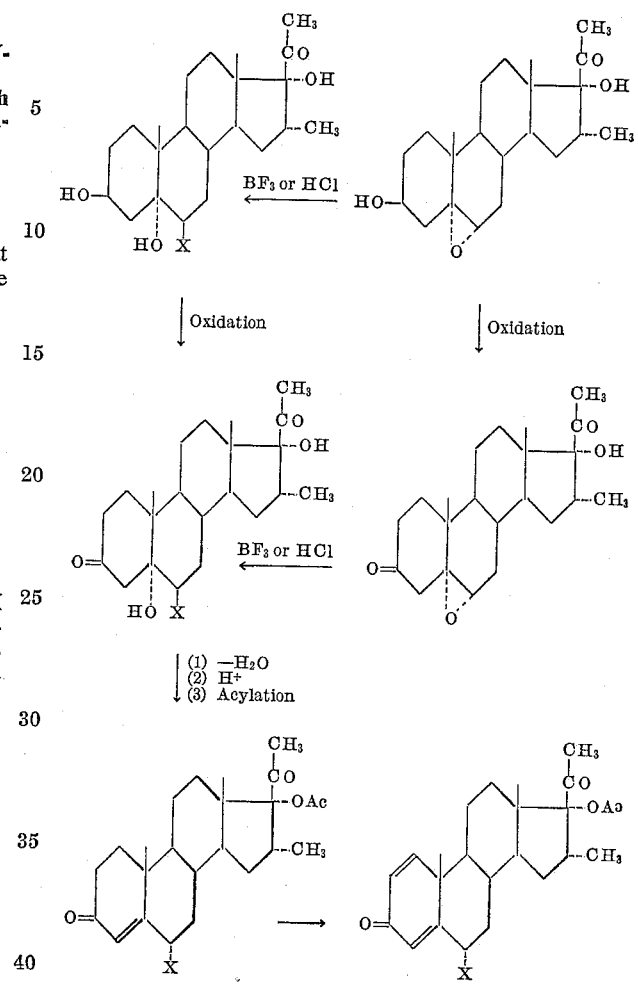

According to the present process the starting materials are oxidized with an organic peracid, more especially perbenzoic acid, monoperphthalic acid or peracetic acid, in the presence of a suitable solvent, such as ether and/or a halogenated hydrocarbon.

The acyloxy groups in the resulting 5:6;17:20-diepoxides are advantageously hydrolyzed with an alkaline agent, such as a solution of a carbonate, bicarbonate or hydroxide of an alkali metal in aqueous methanol or ethanol, dioxane or tetrahydrofurane. Likewise suitable are amines such, for example, as diethylamine, ethylenediamine or ortho-phenylenediamine. It is of advantage to separate the preponderant proportion of 5$\alpha$:6$\alpha$-oxido-3$\beta$:17$\alpha$-dihydroxy-16$\alpha$-methyl-20-oxo-pregnane contained in the product of the hydrolysis from the 5$\beta$:6$\beta$-isomer prior to the next process step by crystallization and/or chromatography on alumina.

For oxidizing the 3-hydroxyl group to the keto group there are suitable oxidizing agents that do not affect the side chain, for example chromic acid/pyridine complex or, when the reaction period is short, a mixture of chromic acid, sulfuric acid and acetone, also N-chloro- or N-bromo-carbonamides or -imides, such as bromosuccinimide or bromacetamide in an aqueous solution, for example in aqueous acetone or pyridine.

The splitting of the 5$\alpha$:6$\alpha$-epoxide leading to the 6$\beta$-fluoro- or 6$\beta$-chloro-5$\alpha$-hydroxy compound can be performed before or after the 3-hydroxyl group has been oxidized to the 3-keto group. This is carried out with hydrochloric or hydrofluoric acid in a solvent such as in an alcohol, ketone, ether, halogenated hydrocarbon, for example methylene chloride or chloroform, or preferably in an aliphatic carboxylic acid of low molecular weight, such as glacial acetic acid, propionic acid or the like, or in a mixture of two or more of the said solvents, advantageously at a temperature range of 0 to 30° C. Instead of hydrochloric acid or hydrofluoric acid there may be used pyridine hydrochloride or collidine hydrochloride or boron trifluoride-etherate in benzene for splitting the 5α:6α-epoxide. These reactions yield 5α-hydroxy compounds containing a fluorine or chlorine atom in the 6β-position. The 3-hydroxy compound is then oxidized to the corresponding 3-ketone with the use of one of the afore-mentioned oxidizing agents. For the elimination of water the 3-oxo-5α-hydroxy-6β-halogeno compounds are treated with bases, for example potassium hydroxide or with an acid, for example hydrochloric acid, whereby Δ⁴-3-keto-6β-halogeno compounds are obtained. Depending on the reaction conditions employed—for example opening the epoxide with hydrogen chloride gas in glacial acetic acid—the Δ⁴-3-keto-6α-halogeno compounds can be manufactured in a single reaction step. The isomerization of the Δ⁴-3-keto-6β-halogeno compounds to the Δ⁴-3-keto-6α-halogeno compounds is advantageously carried out with hydrogen chloride gas in glacial acetic acid.

The esters of the resulting 17α-hydroxy compounds are obtained by treating the latter in the known manner with a halide or anhydride of an aliphatic carboxylic acid, such as acetic, propionic, butyric, or more especially caproic acid, advantageously in the presence of a catalyst such as pyridine, para-toluenesulfonic acid or perchloric acid.

The introduction of the 1:2-double bond into a resulting Δ⁴-3:20-dioxo-17α-acyloxy-16α-methyl-pregnene containing in the 6α-position a fluorine or chlorine atom, can be carried out with a selenium compound having a dehydrogenating effect, for example selenium dioxide or selenous acid, in a tertiary alcohol, such as amylene hydrate or tertiary butanol, or by microbiological dehydrogenation. The latter reaction can be performed with any one of the micro-organisms conventionally used for this purpose, such, for example, as *Didymella lycopersici*, *Corynebacterium simplex*, *Bacillus sphaericus*, *Mycobacterium lacticola*, *Fusarium solani*, or *Calonectria decora*.

In the first stage of the process there are obtained as by-products the isomeric 5β:6β;17:20-dioxido-3β:20-diacyl-oxy-16α-methyl-pregnanes which, on alkaline hydrolysis and acylation in the 3-position, yield a mixture of the isomeric 5:6-oxido-3β-acyloxy-17α-hydroxy-16α-methyl-pregnane-20-ones. The present invention is based on the observation that the isomeric 5β:6β-oxido compounds can be converted in a simple manner into the 5α:6α-oxido-3β-acyloxy-17α-hydroxy-16α-methyl-pregnane-20-ones by treating the 5β:6β-oxido compounds with a mineral acid, such as sulfuric acid, esterifying the secondary hydroxyl group in the resulting 5α:6β-dihydroxy compound with a sulfonic acid, such as methane- or para-toluenesulfonic acid, and treating the resulting sulfonic acid ester with an alkaline agent, such as a carbonate or hydroxide of an alkali metal, whereupon the 5α:6α-oxido-3β:17α-dihydroxy-16α-methyl-pregnane-20-one is formed. These reactions are represented by the following formulae:

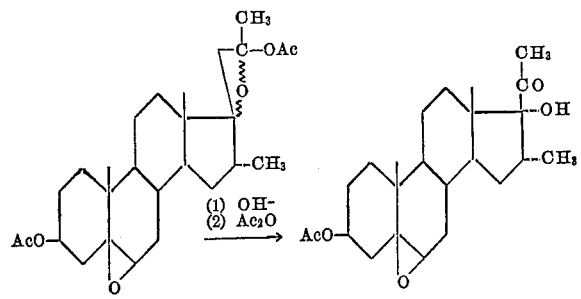

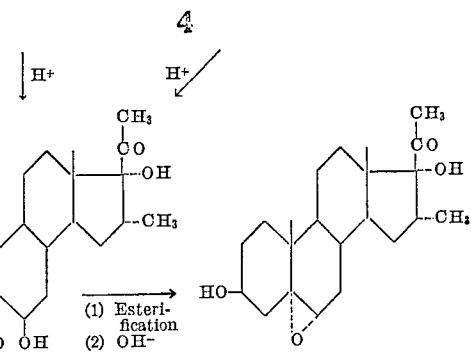

This unification process is applied with advantage to mixtures of the isomeric 5α:6α-oxido and 5β:6β-oxido compounds.

The Δ⁵:¹⁷⁽²⁰⁾-3:20-diacyloxy-16α-methyl-pregnadienes used as starting materials are new; they can be prepared by converting e.g. Δ⁵:¹⁶-3β-acetoxy-20-keto-pregnadienes into corresponding 16α-alkyl compounds by treatment with an alkyl magnesium halide in the presence of cuprous halide in tetrahydrofuran in the absence of alkyl halide, and decomposing the resulting 20-metal-enolates in an acylating medium.

The 17α-esters obtained as final products, such as the 17α-acetates or 17α-caproates of Δ⁴-6α-fluoro-16α-methyl-17α-hydroxy-pregnene-3:20-dione, Δ⁴-6α-chloro-16α-methyl-17α-hydroxy-pregnene-3:20-dione, Δ¹·⁴-6α-fluoro-16α-methyl-17α-hydroxy-pregnadiene-3:20-dione and Δ¹·⁴-6α-chloro-16α-methyl-17α-hydroxy-pregnadiene-3:20-dione, are distinguished by their high progestative action which is superior to that of the natural hormone progesterone.

The following examples illustrate the invention.

Example 1

A solution of 4.1 grams of Δ⁵·¹⁷⁽²⁰⁾-3β:20-diacetoxy-16α-methyl-pregnadiene in 30 cc. of ether is treated with 52 cc. of a 0.575 molar ethereal solution of monoperphthalic acid, and the mixture is kept for 48 hours in the dark at room temperature, whereupon the phthalic acid formed and the excess monoperphthalic acid are removed by extraction with aqueous sodium carbonate solution. The ethereal solution is dried with magnesium sulfate and evaporated, and the residue is caused to crystallize by being triturated with methanol. The resulting diepoxide is a mixture of the four possible isomers which differ by their distinct configuration in the positions 5, 6 and 20. The two isomeric 5α:6α;17α:20-dioxido-3β:20-diacetoxy-16α-methyl-pregnanes can be obtained in the pure state by fractional crystallization from ether. The melting point of the mixture of the two isomers, which differ only by their distinct configuration in the 20-position, is within the range of 165 and 190° C., depending on the ratio of the two isomers.

A solution of 4 grams of the mixture of the isomeric 5α:6α;17α:20-dioxido-3β:20-diacetoxy-16α-methyl-pregnanes in 160 cc. of methanol is treated with a solution of 2 grams of potassium carbonate in 40 cc. of water. The clear reaction mixture is refluxed for 1½ hours and then with stirring diluted with twice its own volume of hot water. The whole is cooled to 0° C. and the crystalline product is filtered off, washed with water until it is free from alkali, and dried in vacuo at 80° C. The 5α:6α-oxido-3β:17α-dihydroxy-16α-methyl-pregnane-20-one obtained in this manner melts at 245° C.

Example 2

A solution of 0.25 gram of 5α:6α-oxido-3β:17α-dihydroxy-16α-methyl-pregnane-20-one in 2.5 cc. of pyridine is poured into a mixture of 0.25 gram of chromium trioxide and 2.5 cc. of pyridine. The reaction mixture is shaken well and kept for 24 hours at room temperature. The pyridine is then cautiously evaporated in vacuo, the residue is thoroughly triturated with 100 cc. of ether, and the ethereal solution is successively washed with dilute acetic acid, sodium carbonate solution and water, dried and evaporated. The amorphous residue is caused to crystallize by being sprinkled with ether; the crystalline product is filtered off and washed with a small amount of ether, to yield 5α:6α-oxido-16α-methyl-17α-hydroxy-pregnane-3:20-dione.

Example 3

A solution of 3.3 grams of 5α:6α-oxido-16α-methyl-17α-hydroxy-pregnane-3:20-dione in 400 cc. of a 1:1-mixture of benzene and ether is treated with 3.3 cc. of boron trifluoride etherate, and the reaction mixture is kept for 8 hours at room temperature, then washed with aqueous sodium bicarbonate solution of 5% strength and with water, dried with magnesium sulfate and evaporated. Purification by crystallization from acetone+hexane yields 5α:17α - dihydroxy-6β-fluoro-16α-methyl-pregnane-3:20-dione.

When the specified starting material is treated, instead of with boron trifluoride etherate, with hydrogen chloride gas in glacial acetic acid for 18 hours, evaporated, washed until free from acid, dried, and recrystallized from acetone+hexane, $\Delta^4$-6α-chloro-16α-methyl-17α-hydroxy-pregnene-3:20-dione is obtained.

For conversion into the 17α-acetate 1 gram of $\Delta^4$-6α-chloro-16α-methyl-17α-hydroxy-pregnene-3:20-dione dissolved in 10 cc. of acetanhydride, 120 mg. of para-toluenesulfonic acid are added, and the mixture is kept for 24 hours at room temperature, then poured into water, boiled for a short time on a water bath, filtered and the dried residue is crystallized from acetone+hexane, to yield $\Delta^4$-6α-chloro-16α-methyl-17α-acetoxy-pregnene-3:20-dione.

In a similar manner higher 17α-esters, such, for example, as the 17α-caproate, of $\Delta^4$-6α-chloro-16α-methyl-17α-hydroxy-pregnene-3:20-dione, can be prepared.

Example 4

A solution of 2.1 grams of 5α:6α-oxido-3β:17α-dihydroxy-16α-methyl-pregnane-20-one in 300 cc. of a 1:1-mixture of benzene and ether is treated with 2.1 cc. of boron trifluoride etherate. After 6 hours the reaction mixture is washed with aqueous sodium bicarbonate solution and then with water, dried with magnesium sulfate and evaporated in vacuo. The residue contains the desired 3β:5α:17α-trihydroxy - 6β - fluoro-16α-methyl-pregnane-20-one which can be converted into the 5α-17α-dihydroxy-6β-fluoro-16α-methyl-pregnane - 3:20 - dione described in Example 3 by oxidation in acetone with excess 8 N-chromic acid at 0° C.

Example 5

Dry hydrochloric acid gas is passed for 2 hours at 15° C. into a solution of 1.6 grams of 5α:17α-dihydroxy-6β-fluoro-16α-methyl-pregnane-3:20-dione in 16 cc. of acetic acid, and the mixture is then kept for 18 hours at room temperature, then diluted with water and extracted with ether. The ethereal solution is washed with aqueous sodium bicarbonate solution, dried with magnesium sulfate and evaporated. The resulting crude $\Delta^4$-6α-fluoro-16α-methyl-17α-hydroxy-pregnene-3:20-dione can be purified by chromatography on silica gel.

The $\Delta^4$-6α-fluoro-16α-methyl - 17α - hydroxy-pregnene-3:20-dione described above can be esterified in the 17-position by the process according to Example 4. This procedure yields, for example, the 17α-acetate, 17α-propionate or 17α-caproate of $\Delta^4$-6α-fluoro-16α-methyl-17α-hydroxy-pregnene-3:20-dione.

Example 6

4 liters of beer wort of 70% strength are sterilized in a shaking vessel (pH 5.1) and inoculated with 150 cc. of a 2-days old agitated culture of *Calonectria decora* grown on beer wort of 70% strength. The vessel is shaken for 24 hours at 27° C., during which time the culture develops well. A solution of 1 gram of $\Delta^4$-6α-fluoro-16α-methyl-17α-hydroxy-pregnene-3:20-dione in 25 cc. of acetone is added under sterile conditions, and the mixture is further shaken at 27° C. After 2 days, the mycelial mass is separated and thoroughly washed with water and ethyl acetate. The combined filtrates are exhaustively extracted with a total of 4 liters of ethyl acetate, and the extracts are washed with water, dried, and evaporated in vacuo. The resulting crude extract (1.1 grams) is chromatographed on a column of 30 grams of silica gel by the fractional elution method, the elution being performed with chloroform and mixtures of chloroform+acetone having an ascending content of acetone. The individual fractions (100 cc. each) are subjected to paper-chromatographic examination. The fractions eluted with chloroform contain only impurities, while the fractions eluted with a 9:1-mixture of chloroform+acetone contain $\Delta^{1:4}$-6α-fluoro-16α-methyl-17α-hydroxy-pregnadiene-3:20-dione which can be recrystallized from acetone+hexane.

To esterify the 17α-hydroxy group a solution of 0.5 gram of $\Delta^{1:4}$-6α-fluoro-16α-methyl-17α-hydroxy-pregnadiene-3:20-dione in 10 cc. of acetanhydride is treated with 50 mg. of para-toluenesulfonic acid, and the mixture is kept for 24 hours at room temperature, then poured into water, the precipitated reaction product is filtered off and recrystallized from acetone+hexane, to yield the 17α-acetate of $\Delta^{1:4}$-6α-fluoro-16α-methyl - 17α - hydroxy-pregnadiene-3:20-dione. In an analogous manner can be prepared higher esters, for example the 17α-propionate or 17α-caproate.

Example 7

A suspension of 5 grams of a mixture of 3β:17α-dihydroxy-5α:6α-oxido - 16α - methyl-allopregnane-20-one and 3β:17α - dihydroxy - 5β:6β - oxido-16α-methyl-allopregnane-20-one in 30 cc. of pyridine is treated with 20 cc. of acetanhydride while being cooled. After 2 hours a clear solution is obtained. The reaction mixture is kept for 20 hours at room temperature and then cautiously evaporated in vacuo in a rotary evaporator. The residue is taken up in a mixture of 80 cc. of ethyl acetate and 10 cc. of water, and the organic layer is washed successively with sodium bicarbonate solution, dilute hydrochloric acid and sodium chloride solution, dried and concentrated to a volume of 10 cc. The hot solution is mixed with 50 cc. of pentane and allowed to crystallize in an ice box. Yield: 5.16 grams (=approximately 93% of theory). The resulting 3-acetate melts at 156–164° C.

A solution of 0.91 gram of a 5:6-isomeric mixture of 3β-acetoxy-5:6-oxido-16α-methyl - 17 - hydroxy-allopregnane-20-one in 70 cc. of acetone is diluted with 30 cc. of water and treated with 1.2 cc. of sulfuric acid of 10% strength. The clear solution is kept for 72 hours at room temperature and the acetone is then distilled off in vacuo, to yield 3β-acetoxy-5α:6β:17α-trihydroxy-16α-methyl-allopregnane-20-one which melts at 235–238° C. after having been recrystallized from methanol. Yield: 81% of theory.

A solution of 0.4 gram of 3β-acetoxy-5α:6β:17α-trihydroxy-16α-methyl-allopregnane-20-one in 5 cc. of pyridine is treated with 500 mg. of methanesulfonyl chloride while being cooled with ice. The reaction product is kept for 16 hours at 0° C. and for 3 hours at room temperature, then poured over ice, taken up in ether, and the ethereal solution is washed successively with dilute hydrochloric acid, sodium bicarbonate solution and water, dried, and concentrated to a volume of 10 cc. Yield: 0.36 gram of crystalline 3β-acetoxy-5α:17α-dihydroxy-6β-mesyloxy-16α-methyl-allopregnane-20-one which decomposes at 170–172° C. Yield: 64% of theory.

A solution of 0.17 gram of 3β-acetoxy-5α:17α-dihydroxy-6β - mesyloxy - 16α - methyl-allopregnane-20-one in 13.5 cc. of methanol is treated with 68 mg. of solid potassium hydroxide. The reaction mixture is refluxed for 3 hours, treated with 10 cc. of water, and freed in vacuo in a rotary evaporator from methanol, whereupon the product is obtained in finely crystalline form. After having been filtered off and dried, the product weighs 0.11 gram (=approximately 90% of theory). It melts at 220–225° C. while turning slightly brown and is identical with the 3β:17α-dihydroxy-5α:6α-oxido - 16α - methyl - allopregnane. 20-one prepared as described in Example 1.

*Example 8*

2 grams of a mixture of 5α:6α;17α:20-dioxido- and 5β:6β;17α:20-dioxido-3β:20-diacetoxy-16α-methyl - pregnane prepared as described in Example 1 are dissolved in 100 cc. of benzene and 100 cc. of acetone, 1.2 cc. of sulfuric acid of 20% strength are added, and the whole is refluxed for 1 hour. The reaction mixture is treated with 2 cc. of pyridine and concentrated to a volume of about 40 cc. 50 cc. of benzene are then added, and the mixture is again concentrated to 40 cc. The residue is treated with 20 cc. of pyridine, and at 0° C. 2 grams (=1.32 cc.) of methanesulfonyl chloride are added in portions. The reaction mixture is kept for 14 hours at 0° C. and then for 6 hours at room temperature. To perform the hydrolysis, a solution of 3 grams of potassium hydroxide in 400 cc. of methanol is added, the mixture is refluxed for 3 hours, 200 cc. of water are added, and the whole is concentrated in a rotary evaporator to a volume of about 50 cc. whereupon 5α:6α-oxido-3β:17α-dihydroxy-16α-methyl-pregnane-20-one precipitates which melts at 220–225° C. Yield: 1.25 grams.

If desired, the treatment with sulfuric acid can be followed by isolation of 3β-acetoxy-5α:6β:17α-trihydroxy-16α-methyl-pregnane-20-one (M.P. 215–220° C.) which is then further reacted as described in Example 7.

What is claimed is:

1. Process for the manufacture of lower aliphatic esters of new halogen-pregnanes, wherein a compound of the formula:

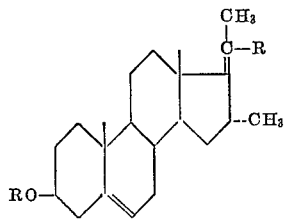

in which R represents a lower aliphatic acyl radical is oxidized with a peracid, the acyloxy groups in the resulting product are then hydrolyzed with an alkaline agent, in the resulting 3β:17α-dihydroxy-5α:6α-oxido-16α-methyl-pregnane-20-one the 3-hydroxyl group is oxidized to the keto group by means of a member selected from the group consisting of a compound of hexavalent chromium, N-X-carbonamides and N-X-carbonimides in which X stands for a member of the group consisting of chlorine and bromine, the resulting 3-keto compound is treated with a member selected from the group consisting of hydrochloric acid, hydrofluoric acid, pyridine hydrochloride, collidine hydrochloride, and boron trifluoride-etherate, any 5α-hydroxy-6β-halogenhydrin formed is dehydrated with a member selected from the group consisting of a mineral acid and a base to form the 4:5-double bond, any Δ⁴-6β-halogeno compound formed is isomerized with hydrogen chloride in glacial acetic acid into the Δ⁴-6α-halogeno compound and at any desired stage of the process following the oxidation of the 3-hydroxyl group the 17α-hydroxyl group is esterified with a member selected from the group consisting of the halide and anhydride of a lower aliphatic acid to produce the desired halogenpregnenes of the formula:

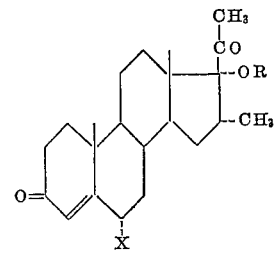

in which R has the meaning given above an aliphatic acyl radical and X stands for a member selected from the group consisting of chlorine and fluorine.

2. Process as claimed in claim 1, wherein the isomeric mixture of the 5:6;17:20-dioxido-3β:20 - diacyloxy - 16α-methylpregnanes obtained after oxidation with a peracid is treated with an oxygenated mineral acid, the secondary hydroxyl group in the resulting 5α:6β-dihydroxy compound is esterified with a sulfonic acid, the resulting sulfonic acid ester is hydrolysed with an alkaline agent, to form 5α:6α - oxido - 3β:17α - dihydroxy-16α-methyl-pregnane-20-one.

3. Process as claimed in claim 1, wherein the isomeric mixture of the 3β:17α-dihydroxy-5:6-oxido-16α-methyl-pregnane-20-one obtained after oxidation with a peracid and hydrolysis with an alkaline agent is reacylated in the 3-position, the 5:6-oxido-3β-acyloxy-17α-hydroxy-16α-methyl-pregnane-20-ones is treated with an oxygenated mineral acid, the secondary hydroxyl group in the resulting 5α:6β-dihydroxy compound is esterified with a sulfonic acid, and the resulting sulfonic acid ester is hydrolysed with an alkaline agent, to form 5α:6α-oxido-3β:17α-dihydroxy-16α-methyl-pregnane-20-one.

4. Process as claimed in claim 1, wherein Δ⁵·¹⁷⁽²⁰⁾-3β:20-diacetoxy-16α-methyl-pregnadiene is used as starting material.

5. 3:20-dioxo-17α-hydroxy - 5α:6α - oxido-16α-methyl-pregnane.

6. 3β-acetoxy-5α:6β:17α-trihydroxy-16α-methyl - pregnane-20-one.

7. 3-lower aliphatic carboxylic acid esters of 3β:5α:6β:17α-tetrahydroxy-16α-methyl-pregnane-20-one.

8. The 6-ester derived from the compounds claimed in claim 7 and a member selected from the group consisting of a lower alkane sulfonic acid and a monocyclic arylsulfonic acid.

9. 3β-acetoxy-6β-mesyloxy - 5α,17α - dihydroxy - 16α-methyl-pregnane-20-one.

References Cited in the file of this patent

UNITED STATES PATENTS 2,837,464  Nobile _____ June 3, 1958
2,905,678  Sarett et al. _____ Sept. 22, 1959

OTHER REFERENCES

Acta Chim. Sinica, vol. 25, No. 6 (1959), pp. 427–428.
Meystre et al.: Helv. Chim. Acta 39, 734–742 (February 9, 1956).
Szpilfogel et al.: Rec. Trav. Chim. 75, 475–480 (May 1956).